June 22, 1954  S. R. RICH  2,682,049
BEAT FREQUENCY NAVIGATION AND GUIDANCE SYSTEM
Filed Dec. 14, 1949  3 Sheets-Sheet 1

INVENTOR
STANLEY R. RICH
BY Elmer J. Gorn
ATTORNEY

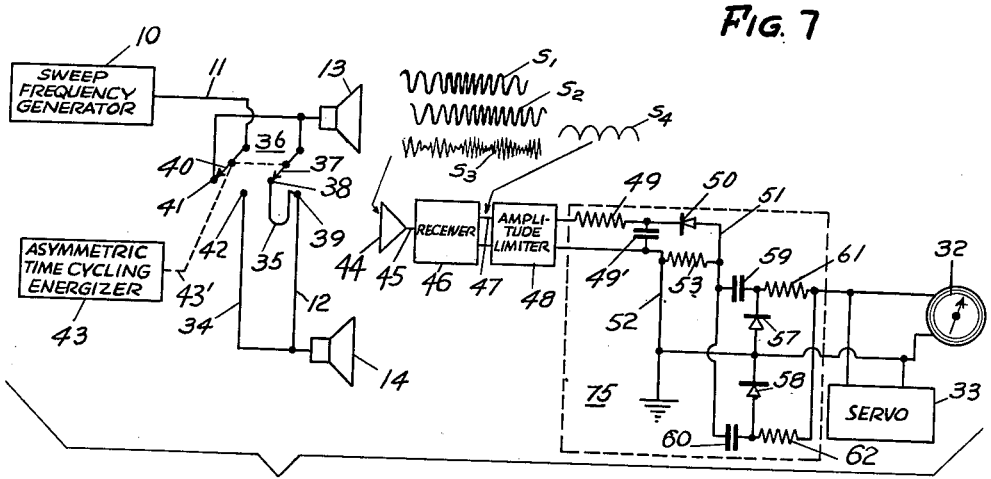

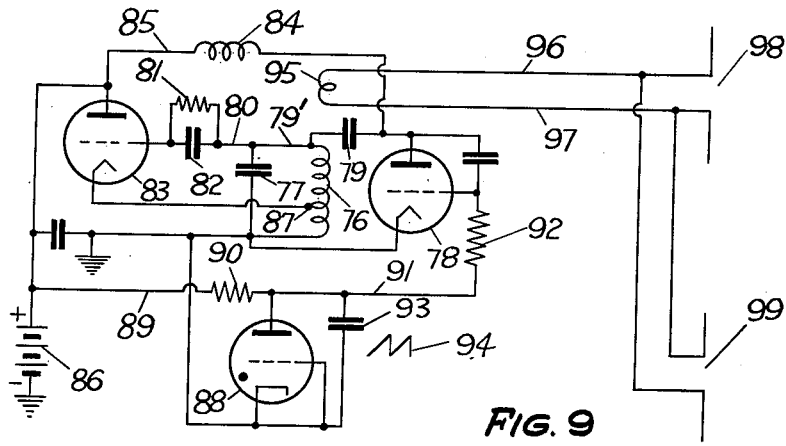
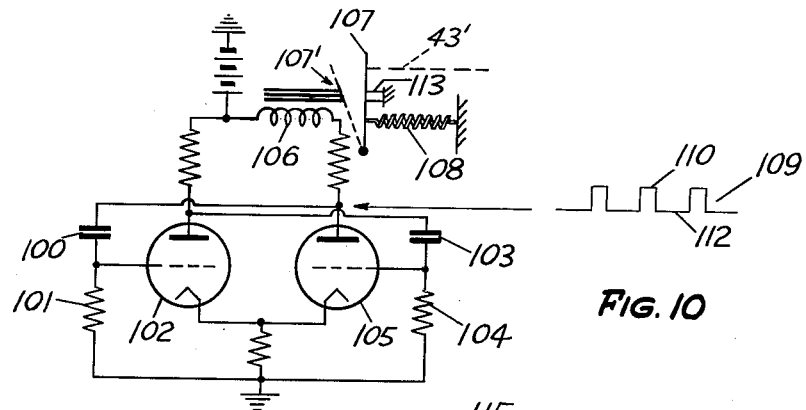
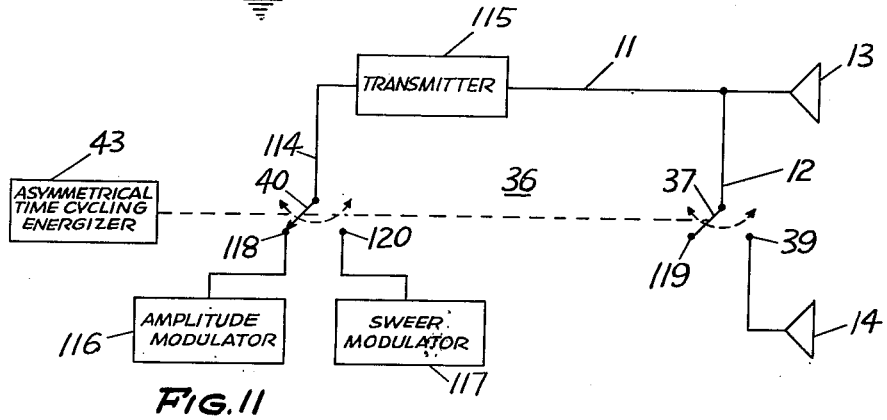

Patented June 22, 1954

2,682,049

UNITED STATES PATENT OFFICE 2,682,049

BEAT FREQUENCY NAVIGATION AND GUIDANCE SYSTEM

Stanley R. Rich, Newton Center, Mass., assignor to Raytheon Manufacturing Company, Newton, Mass., a corporation of Delaware Application December 14, 1949, Serial No. 132,882

3 Claims. (Cl. 343—104)

This invention relates to navigation and guidance systems, and more particularly to beat frequency navigation and guidance systems.

Heretofore, because of the limitations inherent in pulse systems and also in existing low frequency continuous wave systems, the two transmitters of a given hyperbolic pair were required to be separated many miles apart in order to provide useful position resolution. In the present invention, however, by using a beat-frequency technique, it becomes possible to decrease this "base line" distance to a few yards. It also becomes possible to dispense with one of the transmitters formerly required and use a single transmitter as the signal source for two signal radiators or antennas. The present invention also permits a simplification of the receiving apparatus for use with such a beat-frequency system and makes possible very simple means for detecting deviation from a given desired course.

When two similar sweep-frequency signals, having a linear saw-tooth sweep over a band of frequencies, one lagging the other in time, are radiated from separated points in a horizontal plane, a hyperbolic grid work of different beat-frequency lines may be traced by a receiver in the area covered by the signals. The signal radiations, from the radiators as foci, produce these hyperbolic lines which are the loci of particular beat frequencies caused by the mixing of the radiated signals along each of the lines. The beat frequency of each such hyperbolic line is different and the pattern of these lines defines a frequency spectrum determined by the instantaneous difference in frequency between the radiated signals and the distance between the signal radiators. The frequency of succeeding lines, as one passes from one radiator to the other, progressively increases from the lower frequency radiator to the higher. On the equilateral hyperbola, which is a straight line running between the radiators equi-distant from each radiator and perpendicular to the line described by them, the beat frequency is equal to the instantaneous difference in frequencies of the radiated signals. To one side of this line, beat frequencies progressively increase while, to the other side of this line, beat frequencies progressively decrease. Thus, when the beat frequency of this line is known, a beat-frequency sensitive body moving in this region will have a left and right sense of direction with respect to this line as a reference.

In like manner, another similar set of signal radiators in a vertical plane gives an up and a down sense of direction. When the two sets of signal radiators are arranged perpendicular to and bisecting each other, so that the equilateral hyperbola of one of them is made to coincide with the equilateral hyperbola of the other, the coincident path becomes thereby one with a left and right and up and down sense of directions. Such a desirable pattern becomes useful for guiding moving objects along the coincident path either toward a distant target or for homing purposes.

Other hyperbolic paths in the above-described gridwork may also be used to perform important functions. For example, the beat frequency of a hyperbolic line suitable for providing the landing path of an airplane may be selected from the pattern of one set of radiators placed along the runway of a landing strip. Because of the increasing and decreasing frequency effects above and below this reference path, as already explained, an up and down sense with respect to this path as a reference is provided. The left and right sense may likewise be provided by a horizontally placed set of radiators perpendicular to the line described by the first-mentioned set.

In the present embodiment of this invention, such a novel guidance gridwork is achieved by providing generally two radiators at separated points, with a signal link connecting them. A linear sweep-frequency generator is linked to one of the radiators so that, because of a signal travel distance between the two radiators, the signal from the generator is emitted from one radiator a short time before it reaches the other for emission. This time lag introduced by the distance between the radiators results in a different frequency being emitted from each transmitter at any given instant. By using a saw-tooth sweep at the common signal source, this spread of transmitted frequencies remains the same throughout most of each cycle. As a practical result, a stable hyperbolic gridwork of the type explained above is created.

One embodiment of the present invention incorporates the above in a guidance system which operates by comparing to a reference beat frequency of the same frequency as that of a selected hyperbolic path in the gridwork the beat frequency determined by the position of the signal sensitive body. The results of such a comparison may be registered on a suitable meter showing degree and direction of deviation from the reference hyperbola. In other applications, this comparison may be used to operate, for example, a servo device controlling the movement of the body, to thereby direct its course on the path of the selected hyperbola.

To insure a proper reference beat frequency in the signal sensitive moving body, the beat frequency of a desired hyperbola is obtained by a probe located at a convenient point on the selected hyperbola and linked to a beat-frequency detecting receiver. The beat frequency so detected is then retransmitted by a carrier of a different frequency from any of those emitted by the pairs of radiators.

In another embodiment of this invention for navigation or guidance along a selected hyperbolic path, an alternative system for giving a left and right sense of error with respect to the given reference is achieved. By alternately switching the signal of the frequency modulated generator from one radiator to the other, the time lag is periodically reversed between the radiators. This causes a reversal of the hyperbolic gridwork of beat frequencies. The lines which designated the low frequencies are changed to lines designating high beat frequencies and vice versa. Only the selected hyperbola between the radiators continues to have an unchanging beat frequency. Further by producing these reversals in accordance with a time sharing plan, such as a cyclic operation with three units of time to one radiator, and one unit of time to the other radiator, a left and right sense as to the selected hyperbola is produced. On one side of this hyperbola, one beat frequency registers for three units of time and another beat frequency registers for only one unit of time, while on the other side of this line the time condition is reversed.

The above is an illustration of time sharing asymmetry. In the system just described, the sense of direction of error is provided by identifying the higher or lower beat frequency with the length of time of its recurrence in each cycle. The case of three units to one cited above is but an example. The times in the asymmetric cycle may have any ratio as long as they are not equal.

This alternate system is achieved by providing two signal links between the antennas with an asymmetrical time cycling device operating a double throw switch for alternately sending the generated signal first to one antenna, and then to the other antenna, and simultaneously altering the length of signal link between the antennas, thereby providing reversals in the hyperbolic gridwork pattern about a selected hyperbola.

In a third embodiment of this invention, the above hyperbolic gridwork is made to alternate with an amplitude modulated fixed frequency reference signal in a cyclic time sharing plan. The rate of amplitude modulation of the fixed frequency reference signal is at the same frequency as the beat frequency of the selected hyperbola in the gridwork.

Apparatus for operating in the gridwork patterns generated as mentioned above consists generally of suitable antenna and receiver apparatus arranged to receive and detect the beat-frequency signals at a point in the gridwork corresponding to the position of a moving body in this gridwork, and suitable frequency discriminating and comparing circuits for these received signals.

The foregoing and other advantages, objects and features of the invention will be better understood from the following description of exemplifications thereof, reference being had to the accompanying drawings forming part of this specification, wherein:

Fig. 4 is a schematic view of a second embodiment of the invention;

Fig. 6 is a graph of output voltage versus beat frequency of a typical frequency discriminating circuit in Fig. 4;

Fig. 7 is a graph of typical voltage versus time in the comparator circuit shown in Fig. 4;

Fig. 8 is a schematic view of a frequency discriminating comparator suitable for use in Fig. 1;

Fig. 9 is a schematic view of a sweep-frequency generator and antenna system suitable for use in the invention;

Fig. 10 is a view of a suitable cyclic timing switch energizer for use in the invention; and Fig. 11 is a schematic view of a third embodiment of a signal generating apparatus in the invention.

Figure 1:
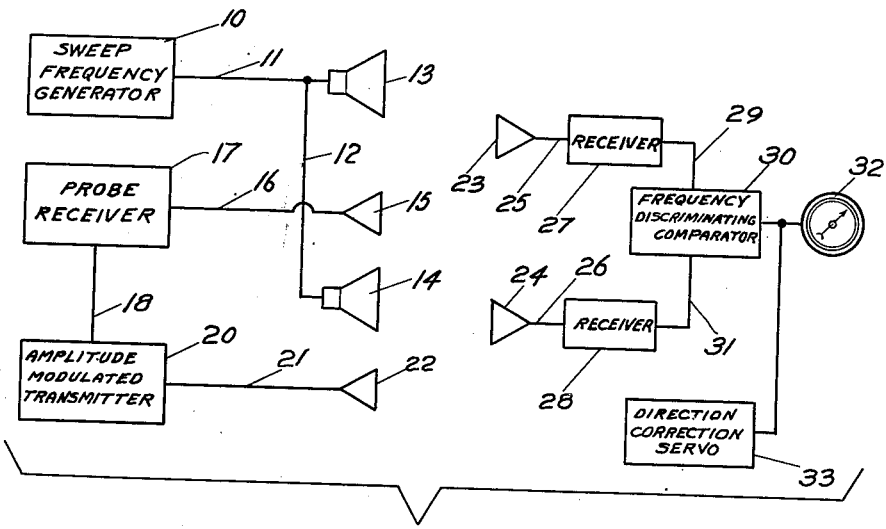
Fig. 1 is a schematic view of a preferred embodiment of the invention.
Figure 2:
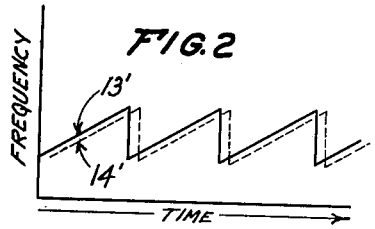
Fig. 2 shows a typical frequency versus time graph for the output of a sweep-frequency generator in Fig. 1.
Figure 3:
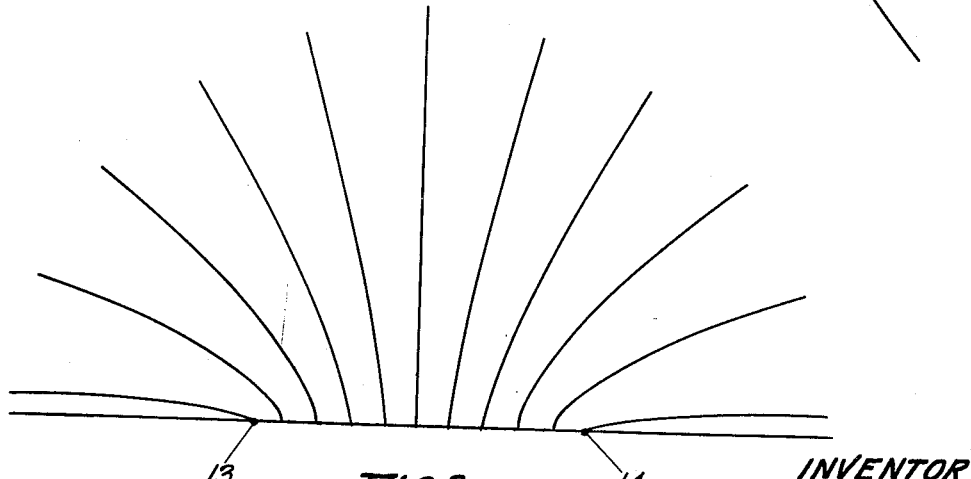
Fig. 3 is a view of a hyperbolic gridwork pattern produced in the invention.

Referring to the drawings in more detail, Fig. 1 illustrates an embodiment of this invention particularly adapted to operate on a selected beat-frequency hyperbola by a comparison of the beat frequency of the selected hyperbola to the beat frequency determined by the position of a receiver in a hyperbolic grid-work pattern. Varying frequency signals, which, for example, vary in the range from 900 to 1000 megacycles, are generated by sweep-frequency generator 10. One such generator suitable for use in this invention to be described hereinafter is shown in Fig. 9. The signal frequency of generator 10 is made to vary linearly with time as illustrated in Fig. 2. The signals so generated are sent over lines 11 and 12 to directional antennas 13 and 14, in this instance directed along parallel lines as shown. Because of the distance between antennas 13 and 14, which in this instance is approximately 130 ft., the signals generated by the generator 10 will reach antenna 13 about $0.102 \times 10^{-6}$ seconds sooner than antenna 14. Thus, as illustrated in Fig. 2, at a given instant of time, the frequency 13' emitted from antenna 13 is, in the present embodiment, about 11,450 cycles higher than the frequency 14' emitted from antenna 14. Between antennas 13 and 14 may be thereby traced a hyperbolic gridwork of constant beat-frequency lines varying from 1 to 22,900 cycles/seconds, some of which are illustrated in Fig. 3 as extending from the antenna base line due to the directional nature of antennas 13 and 14. Non-directional antennas would produce a similar pattern on both sides of the base line.

It should be understood that the same result may be obtained by separate generators for each of antennas 13 and 14, provided that they are both sweep-frequency generators synchronized to sweep at the same rate over the same interval of time. The use of a single sweep-frequency generator in the present embodiment is made possible by the nature of the beat-frequency system and simplifies the problem of synchronizing the rate and period of sweep at the separate antennas.

To obtain a reference frequency for beat-frequency comparison, the present embodiment has generally a probe 15 which may be a suitable antenna located at a convenient point on the particular hyperbola selected for use in this system. The signals picked up by probe 15 are sent by line 16 to a conventional amplitude modulation detecting receiver 17, whose radio frequency tuning is broad enough to cover all of the frequencies swept by the sweep-frequency generator, and whose audio circuits amplify the beat frequency only. The beat frequency of the selected hyperbola is detected and amplified by receiver 17 and sent as a beat-frequency signal by line 18 to a conventional amplitude or frequency modulated transmitter 20, where it is made to modulate a suitable carrier signal which is then sent by line 21 to an antenna 22 for radiation. The frequency of the carrier signal lies outside of the range of frequencies used to produce the hyperbolic gridwork pattern so as to prevent interference.

A suitable receiver apparatus for navigation or guidance in the above-described hyperbolic gridwork pattern is shown in the right-hand side of Fig. 1. This apparatus is located on a body (not shown) navigating or being guided within the gridwork. Two antennas 23 and 24 are led by lines 25 and 26, respectively, to receivers 27 and 28. Receiver 27 is a conventional amplitude modulation receiver tuned to receive the reference frequency signal radiated from antenna 22. Receiver 28 is also a conventional amplitude modulation detecting receiver, similar to receiver 27. The particular beat frequency determined by the position of the antenna 24 in the hyperbolic pattern at any given instant is detected and amplified by receiver 28 and sent through an output line 31 of the receiver 28 to the frequency discriminating comparator 30. The reference beat frequency is detected and amplified by receiver 27 and similarly sent from receiver 27 through an output line 29 to the frequency discriminating comparator 30 where the difference in the above two frequencies at any given instant is compared. The result of this comparison is made to appear as a voltage and current difference whose magnitude and directions depend upon the difference in beat frequencies from receivers 27 and 28. One such frequency discriminating comparator suitable for use in the invention is shown schematically in Fig. 8 to be described hereinafter. This difference may be made to register as a visual indication by a suitable ammeter or voltmeter 32 which may be calibrated to read in terms of deviation from the selected hyperbolic path; such indicated deviation may then be used for navigation of the body with respect to the selected hyperbolic path. The output of the frequency discriminating comparator may also be sent to a direction correcting servo 33 which controls the steering mechanism of the body, thereby providing automatic guidance of the body with respect to the selected hyperbolic path.

A second embodiment of this invention is adaptable to navigation and guidance along a selected hyperbola without a separate beat-frequency reference signal being generated. In this embodiment, shown in Fig. 4, the reference beat-frequency generating apparatus shown in Fig. 1 has been removed, and antennas 13 and 14 have additional lines 34 and 35 inserted with a special signal reversing switch arrangement placed in the path of the sweep signals from the generator 10. A double switch 36 is placed in lines 34 and 12 in the manner shown in Fig. 4, so that a switch arm 37 of the double throw switch 36, by means of terminals 38 and 39, may be made to include or exclude the signal delaying line 35 with respect to line 12. Another switch arm 40 of the double throw switch 36, by means of a terminal 41, may send the sweep signals from generator 10 to antenna 13 before antenna 14, and, by means of a terminal 42, may reverse the signal timing of antennas 13 and 14 by sending the sweep signals to antenna 14 before antenna 13. The switch arms 37 and 40, being linked, move together to both change the lines of travel of the signals and to change the length of effective signal line between antennas 13 and 14. Therefore, by alternating the position of switch 36 in the above manner, the hyperbolic gridwork pattern, shown in Fig. 3, is also made to alternate with the beat frequency of only a selected hyperbolic line, remaining unchanged regardless of change in position of the switch. The hyperbola in the gridwork, which remains unchanged, is determined by the length of the line 35 which lies between the terminals 38 and 39.

Figure 5:
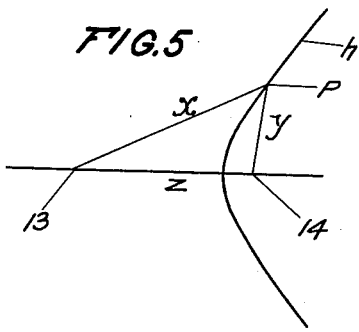
Fig. 5 is a beat-frequency measuring diagram for determining the position of a selected hyperbola used in the invention.

This may be seen as follows. If, for example, in the present embodiment, generator 10 is made to sweep signals as shown in Fig. 2, and these signals are made to pass through line 11 to antenna 13 from which they are radiated, and a short time later reach antenna 14 from which they are also radiated, the beat frequency of a hyperbola $h$ (Fig. 5) will be determined by the signal time difference of any point P on the hyperbola $h$ from antenna 13 taken by two different routes. One route is shown by the line $x$ and the other is shown by lines $y$ and $z$.

If the direction of travel of the signals is reversed so that they are now emitted from antenna 14 before antenna 13, the beat frequency of hyperbola $h$ will be the same only if the signal time delay at point P is kept the same. Since the time delay is proportional to the distances of signal travel, the comparison may be made by scalar length quantities. Thus, with the signals traveling from antennas 13 to 14, the signal travel distance difference to hyperbola $h$ is $$(y+z)-x$$

For signals traveling from antenna 14 to 13, the signal travel distance difference to hyperbola $h$ is $$(z+x)-y$$

These differential distance values may be made equal by adding to the smaller a signal line such as 35. This may be expressed:

$$(y+z)-x+u=(z+x)-y$$
$$u=2(x-y)$$

where $u$ is the length of the line 35. Therefore, by correspondingly altering the length of line between antennas 13 and 14 with change in switch 36 position, selected hyperbola $h$ will retain a constant beat frequency despite changes in position of switch 36. On the other hand, as switch 36 changes position, the beat frequencies of hyperbolas on either side of the selected $h$ hyperbola will change. For example, when the signals travel from antenna 13 to 14, beat frequencies to the right of the hyperbola $h$ will progressively decrease while the beat frequencies of hyperbolas to the left of the hyperbola $h$ will progressively increase. When the position of switch 36 is changed so that the signals travel from antenna 14 to antenna 13, the pattern about the hyperbola $h$ is reversed. The beat frequencies of hyperbolas to the right of hyperbola $h$ now progressively increase while beat frequencies of hyperbolas to the left progressively decrease.

In the particular case where the equilateral hyperbola is selected as the desired path, the length of the signal line between antennas 13 and 14 will remain the same length for either position of the switch 36. In this instance a double throw switch is not necessary. Switch arm 37 may be replaced with an unbroken signal line between antennas 13 and 14.

An asymmetric time cycling energizer 43 is connected by an arm 43' to the switch 36 so as to cause it to change position in accordance with a cyclic time sharing plan. For example, in this instance, the switch arms 40 and 37 are held on terminals 41 and 38 for three units of time, and on terminals 42 and 39 for one unit of time. Also 20 cycles per second was found to be a convenient time cycle base. However, other cyclic rates may be used equally well. A suitable device for energizing the switch 36 in accordance with such an asymmetric time cycle is shown in Fig. 10 to be hereinafter described. Any suitable time sharing plan may be used provided it is of an asymmetric nature.

With such a time sharing plan, a left and right sense of direction with respect to the selected hyperbola $h$ is achieved. For example, to the right of the hyperbola $h$, a beat frequency below the beat frequency of $h$ may be registered for three units of time, and a beat frequency above the beat frequency of $h$ for one unit of time. In such case, to the left of the hyperbola $h$, the high and low beat frequencies will have an opposite time relation. A sense of degree of deviation from $h$ becomes also apparent because the range between the high and low beat frequencies increases as divergence from $h$ increases.

A suitable receiver apparatus for navigation and guidance in this alternating hyperbolic gridwork is shown in the right-hand side of Fig. 4. At a particular point in the gridwork where an antenna 44 is located, two synchronized frequency swept signals $S_1$ and $S_2$ of different instantaneous frequencies radiated from the antennas 13 and 14, respectively, add algebraically, producing a resultant signal $S_3$ whose amplitude varies with time in accordance with the difference in frequency between the two components. The signal $S_3$ is picked up by antenna 44 and sent by line 45 to an amplitude modulation detecting receiver 46, similar to receiver 28, where the beat frequency is detected and made to appear in this instance as a signal $S_4$. The signal $S_4$ is sent by line 47 to a frequency discriminating circuit which is designed with an output voltage characteristic such that its output depends only on the detected beat frequency. In one such circuit, the signal $S_4$ is sent by line 47 to an amplitude limiter 48 so as to remove any amplitude variations from the signal $S_4$ caused, for example, by noise. The amplitude limiter is of conventional design and may be similar to limiters used in existing frequency modulated receivers. A resistance 49 and condenser 49' and rectifier 50, arranged in lines 51 and 52 from the limiter 48, as shown, effect a voltage response across the load resistance 53 as shown by a curve 54 in Fig. 6. The curve 54 is substantially linear between the points 55 and 55' which correspond to the limits of the spectrum of beat frequencies encountered in operation. A point 56 between points 55 and 55' corresponds to the beat frequency of the selected hyperbolic path $h$. Two peak rectifiers 57 and 58 are arranged with condensers 59 and 60, and resistances 61 and 62 of proper proportion to provide a comparator circuit, as shown, in which a current is made to flow through indicator 32 in one or the other direction depending on whether the beat-frequency pattern corresponds to that received by antenna 44 to one side or the other of the selected hyperbola $h$. This may be more clearly seen as follows. Because of the asymmetrically varying beat frequencies of a given hyperbolic line as explained above, a typical pattern of voltage across the rectifiers 57 and 58 is shown by a voltage versus time graph in Fig. 7. The direct current components in the comparator circuit are removed by condensers 59 and 60 thereby causing a zero axis 64 disposed so that areas 65 and 66 are equal. Peak rectifiers 57 and 58 measure the peak positive and negative voltages 67 and 68, respectively. The difference between these is taken through resistors 61 and 62 so that a unidirectional current is caused to flow through the indicator 32 and servo 33. Since the spread between voltages 67 and 68 is dependent upon the hyperbolic path on which antenna 44 is located, the magnitude of the above current is a function of the deviation of antenna 44 from the reference hyperbola.

A frequency discriminating comparator circuit 30 suitable for use in Fig. 1 is shown in Fig. 8.

The beat-frequency signal from receiver 27 is sent to an amplitude limiter 69 and the signal from receiver 28 is sent to an amplitude limiter 70. In the limiters, variations in amplitude of the signals are removed, thereby providing a proper base for frequency comparison.

An asymmetric time cycling energizer 71, for example, as shown in Fig. 10, operates a double throw switch 72 to alternately pass the signals from limiters 69 and 70 through lines 73 and 74 to a frequency discriminating and comparing circuit 75, as described above and shown by a dotted line box 75 in Fig. 4. The energizer 71 has a time sharing plan and a cyclic time base as described with respect to the timing energizer 43 above.

A sweep-frequency generator and antenna arrangement suitable for use in this invention is shown schematically in Fig. 9.

An inductance coil 76 and capacitor 77 are arranged in an oscillatory parallel circuit across the plate and cathode terminals of a reactance tube 78. A condenser 79 is inserted between the plate terminal of the tube 78 and one side 79' of the above parallel oscillatory circuit to prevent short circuiting the direct current in the plate circuit of tube 78. The side 79' is also led by a line 80 and grid leak resistance 81 with a bypassing condenser 82 to the grid of a triode 83. The plate circuit of the triode 83 is coupled through a radio frequency choke 84 to the plate circuit of the reactance tube 78 by line 85. A positive potential is maintained across tubes 78 and 83 by connecting to line 85 a power source as battery 86. The cathode of the tube 78 is led to ground while the cathode of the tube 83 is tapped to a suitable point 87 on the inductance coil 76. The plate circuit of a gas triode discharge tube 88 is connected to the positive terminal of the power source 86 by a line 89 having a resistance 90. The plate circuit of the tube 88 is also connected by a line 91 to the grid circuit of the tube 78 through a resistance 92. A condenser 93 connected across the plate and cathode terminals of the gas discharge tube 88 will effect a linear sweep potential 94 across the condenser 93. In this instance, the resistance 90 and capacitance 93 are adjusted to produce a sweep frequency of 400 cycles per second; however, other frequencies may be used equally well. This sweep voltage accordingly alters the grid voltage of the reactance tube 78, which in turn causes the tube 78 to appear as a changing reactance, thereby causing the frequency of oscillation in the parallel capacitance 77 and inductance 76 circuit to vary in a similar relation. A secondary coil 95 coupled to the primary coil 76 has induced in it signals of the same frequency which are sent through lines 96 and 97, which may be a coaxial cable, to the doublets 98 and 99 which correspond to the radiators 13 and 14 discussed above.

One example of a suitable time cycling energizer 43 for switch 36 is shown in Fig. 10. It consists of a multivibrator circuit in which the asymmetry of the time cycle is produced by choosing condensers and resistances of such values that the product of a condenser 100 and resistor 101 in the grid circuit of triode 102 is different from the product of a condenser 103 and a resistance 104 in the grid circuit of a triode 105. The extent by which these products differ from each other will determine the proportion of the time sharing plan discussed above. A solenoid 106 in the plate circuit of the triode 105 is arranged to activate a lever arm 107 attached by link 43' to the double throw switch 36. A spring 108 is also attached to the lever arm 107 to cause it to move to the opposite position when it is released by the solenoid 106. Because of the above difference in products of the capacitances and resistances, the current pattern in the plate circuit of the triode 105 will vary nearly as a rectangular wave as shown at 109. This current flowing through the solenoid 106 causes the solenoid to be energized by each current peak 110 so as to pull the lever arm 107 to a stop 107', which may also be the magnetic core of solenoid 106. When the current again reaches a null 112, the solenoid 106 is de-energized, permitting the spring 108 to pull the lever arm 107 back to a stop 113.

A third embodiment of this invention incorporates some of the features of each of the above two embodiments. The double throw switch 36 energized by the asymmetric time cycling energizer 43 is arranged in line 12 between transmitters 13 and 14 and in a line 114 to a transmitter 115 in the manner shown in Fig. 11, so that when the line 12 is open, as shown, the transmitter 115 is connected to an amplitude modulator 116 and, when the line 12 is closed, the transmitter 115 is connected to a sweep modulator 117. The transmitter 115 may be of known conventional design. The amplitude modulator 116, when combined with the transmitter 115, forms an amplitude modulated transmitter such as, for example, the amplitude modulated transmitter 20 referred to in Fig. 1 with an additional means for generating a modulating frequency signal such as, for example, a suitable oscillator. When the sweep modulator 117 is combined with the transmitter 115, a sweep frequency generator is formed such as, for example, shown in Fig. 9. Thus, with switch arm 40 on a terminal 118 and switch arm 37 on a terminal 119, the amplitude modulator causes the transmitter signal to be modulated in amplitude at a frequency equal to the beat frequency of the selected hyperbola $h$. The signal from transmitter 115 amplitude modulated at this frequency passes through line 11 and is radiated by antenna 13 to provide the reference beat frequency. Because the line 12 is open, no signal will reach antenna 14.

With the switch arm 40 on terminal 120, and the switch arm 37 on terminal 39, the sweep-frequency modulator 117 causes the signal of transmitter 115 to sweep over a band of frequencies which are sent by line 11 to antenna 13 for radiation and by line 12 to antenna 14 for radiation a small interval of time later, thereby producing a hyperbolic gridwork of beat frequencies as described above. The asymmetrical time cycling energizer 43 causes switch 36 to alternate in accordance with a time sharing plan as explained above. Therefore, the gridwork pattern will alternate with the reference signal, each existing for a number of units of time determined by the cycle of the cycling energizer 43.

A receiving and analyzing apparatus as shown in the right-hand side of Fig. 4 may be used for navigation and guidance in this system as explained above in the operation of that apparatus.

This invention is not limited to the particular details of construction and processes described, as many equivalents will suggest themselves to those skilled in the art. It is accordingly desired that the appended claims be given a broad interpretation commensurate with the scope of the invention within the art.

What is claimed is:

1. In a navagation and guidance system means for producing a fixed frequency signal, means for modulating the amplitude of said signal so as to produce an amplitude modulated signal, means for modulating the frequency of said signal so as to produce a sweep-frequency signal, switch means disposed to connect one or the other of said modulating means to said first mentioned means, means for causing said switch means to alternately connect one and the other of said modulating means to said first mentioned means in a continuous asymmetrical time cycle, two means at separated points for radiating signals, a signal link between said first mentioned means and said radiating means disposed to cause the signal of said sweep to radiate from one of said radiators a short time before radiating from the other of said radiators, and switch means in said signal link synchronized with said first mentioned switch means so as to pass said amplitude modulated signal to only one of said radiators.

2. In a navigation and guidance system, first and second signal radiators disposed a fixed distance apart, means providing a signal link between said radiators, means to produce a signal, means connected in circuit with said signal producing means alternately to modulate said signal in one or the other of two different fashions in a continuous asymmetrical time cycle, switch means connected between said signal producing means and one of said radiators, said switch means having first and second alternative dispositions, said switch means in said first disposition furnishing said signal to both of said radiators in a first fashion to produce a first radiation pattern, and in said second disposition furnishing said signal to one only of said radiators in a second fashion to produce a second radiation pattern, and means for causing said switch means alternately to assume one or the other of said dispositions in said continuous asymmetrical time cycle.

3. In a navigation and guidance system, first and second signal radiators disposed a fixed distance apart, means providing a signal link between said radiators, means to produce a sweep-frequency signal and a fixed-frequency signal, switch means connected between said signal producing means and said radiators, said switch means having first and second alternative dispositions, said switch means in said first disposition furnishing said sweep frequency signal to said first radiator and through said link subsequently to said second radiator, said switch means in said second disposition furnishing said fixed frequency signal to only said first radiator, and means for causing said switch means alternately to assume one or the other of said dispositions in a continuous asymmetrical time cycle.

References Cited in the file of this patent

UNITED STATES PATENTS

| Number | Name | Date |
|---|---|---|
| Re. 23,050 | Brunner | Nov. 23, 1948 |
| 1,815,246 | Englund | July 21, 1931 |
| 1,933,248 | Evans et al. | Oct. 31, 1933 |
| 2,148,267 | Honore | Feb. 21, 1939 |
| 2,413,620 | Guanella | Dec. 31, 1946 |
| 2,413,694 | Dingley | Jan. 7, 1947 |
| 2,423,305 | Fletcher | July 1, 1947 |
| 2,451,823 | Guanella | Oct. 19, 1948 |